United States Patent [19]
Scherbatskoy

[11] 4,351,037
[45] Sep. 21, 1982

[54] SYSTEMS, APPARATUS AND METHODS FOR MEASURING WHILE DRILLING

[76] Inventor: Serge A. Scherbatskoy, P.O. Box 1936, Fort Worth, Tex. 76101

[21] Appl. No.: 110,848

[22] Filed: Jan. 10, 1980

Related U.S. Application Data

[62] Division of Ser. No. 857,677, Dec. 5, 1977.

[51] Int. Cl.³ .......................... G01V 1/40; G01V 1/02
[52] U.S. Cl. ........................................ 367/85; 175/40;
33/307; 375/23
[58] Field of Search ..................................... 367/83–85;
33/307; 175/40, 41, 48, 50; 375/23

[56] References Cited
U.S. PATENT DOCUMENTS 3,711,825  1/1973  Claycomb ............................ 367/85
3,736,558  5/1973  Cubbers ............................... 367/85
4,078,620  3/1978  Westlake et al. .................... 367/83

Primary Examiner—Nelson Moskowitz
Attorney, Agent, or Firm—Head & Johnson

[57] ABSTRACT

A method and apparatus for continuously logging while drilling a well bore with a rotary drilling rig comprising a drill string, a jet type drill bit, and mud pump means for circulating fluid under pressure. The apparatus generally includes means for sensing one or more downhole parameters near the drill bit, means for generating a sequence of electrical pulses representative of said parameter, and means for generating negative mud pressure pulses in the drilling fluid ("drilling mud") within the drill string in response to said electrical pulses. Receiving means at the earth's surface detect the negative mud pressure pulses and utilize the sequence of these pulses to produce signals representative of said parameter. The receiving means employ means to substantially eliminate the effects of the pressure pulsations generated by the mud pump and to extract the negative mud pressure pulses the sequence of which represent the downhole parameter. The means for generating the negative mud pressure pulses involves utilization of the existing energy on the high pressure side of the drill bit through a bypass to the low pressure side of the drill bit controlled by a valve mechanism and arrangement. The design of the valve mechanism and arrangement is such that the valve can be powered for actuation as necessary over a requisite time period by self-contained downhole power source, and is not subject to unacceptable wear.

29 Claims, 18 Drawing Figures

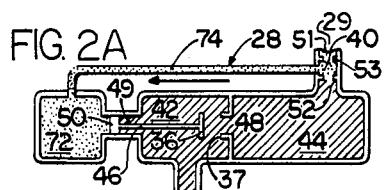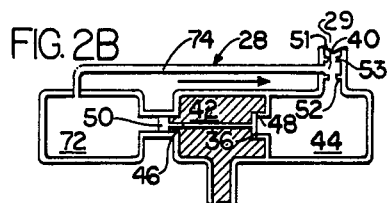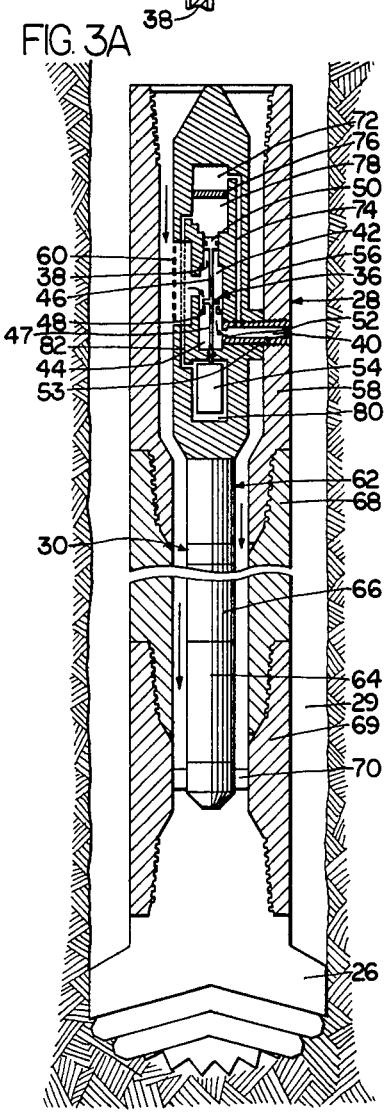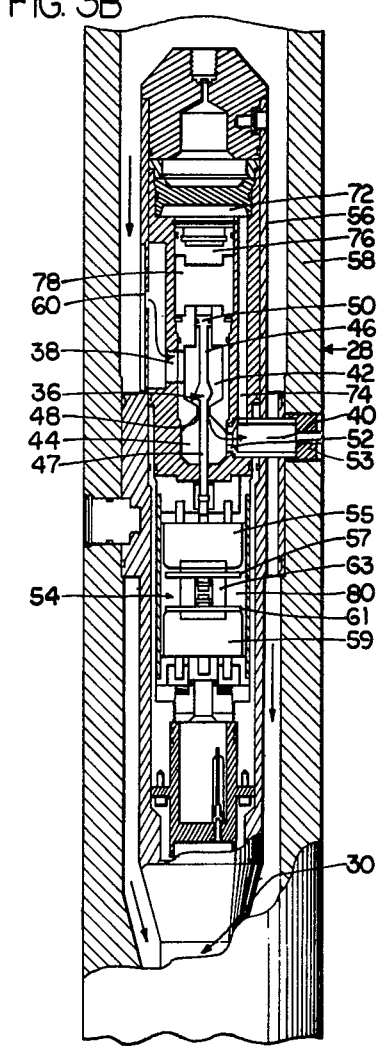

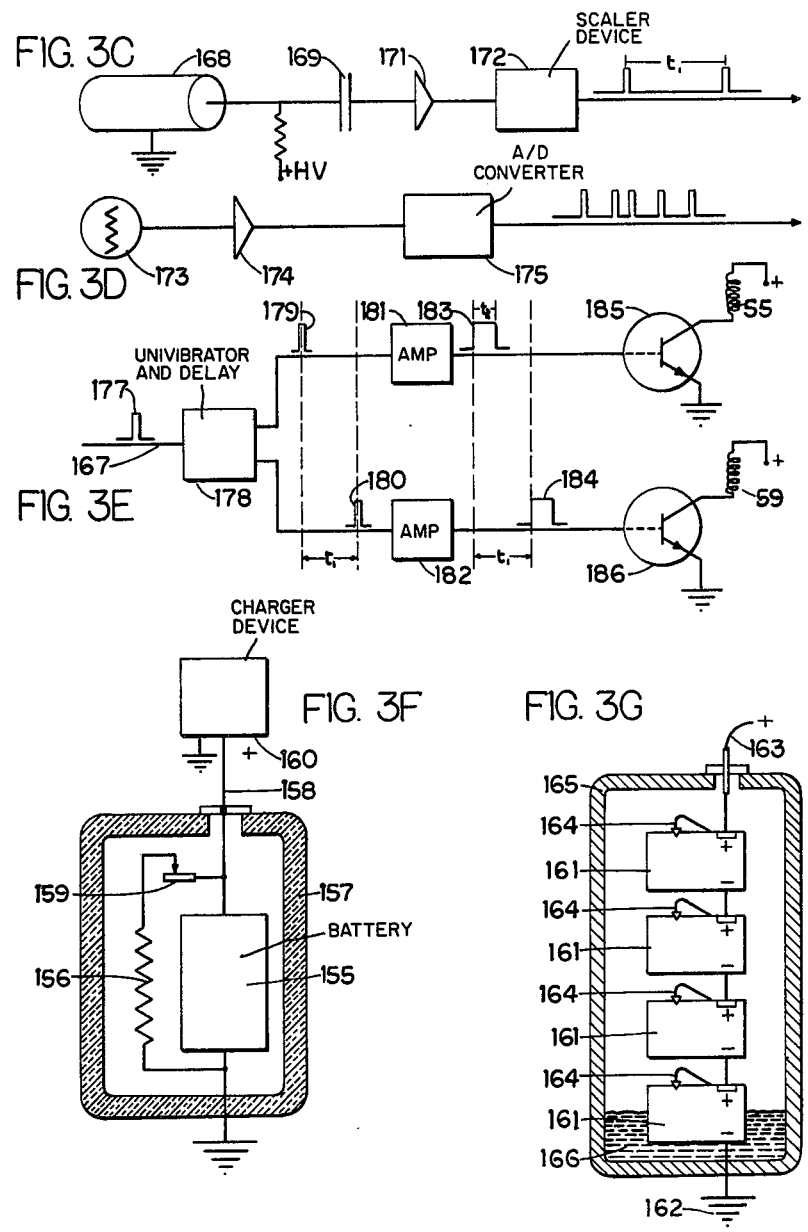

FIG. 10
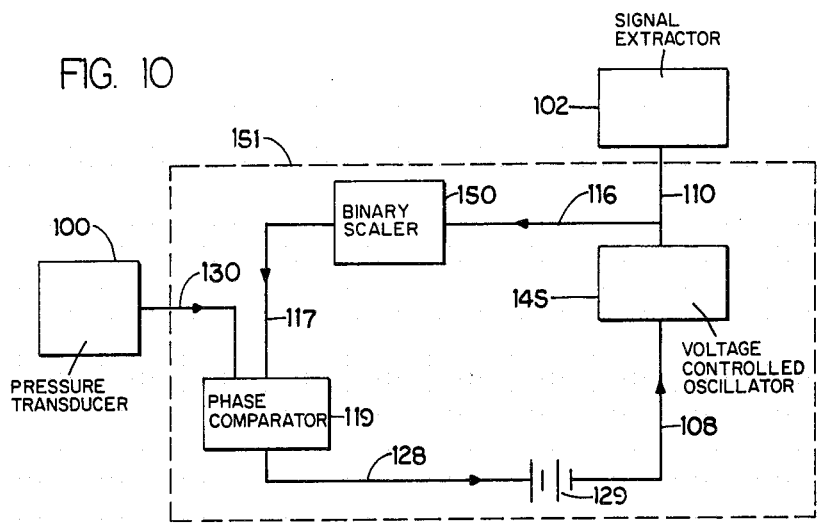
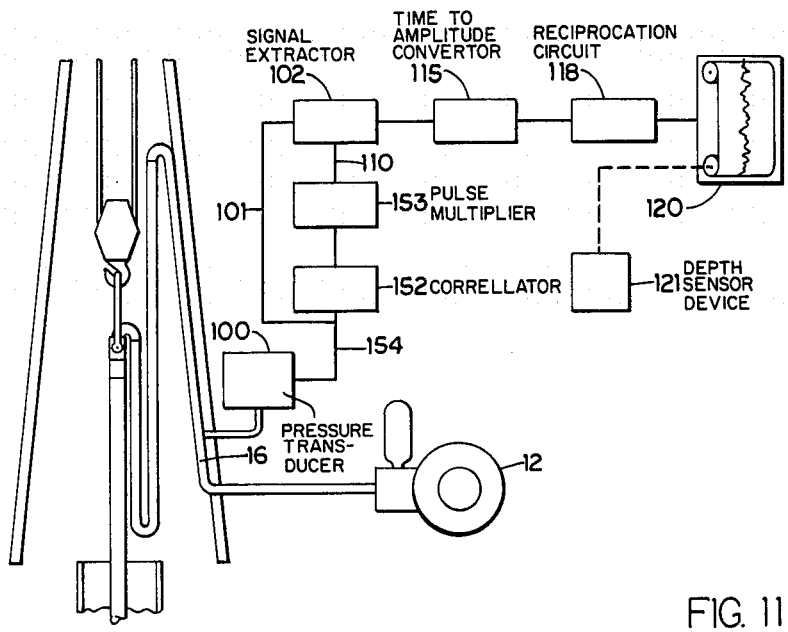
FIG. 11

SYSTEMS, APPARATUS AND METHODS FOR MEASURING WHILE DRILLING

This application is a division of a co-pending application, Ser. No. 857,677 filed by Serge A. Scherbatskoy on Dec. 5, 1977 on "Improved Systems, Apparatus and Methods for Logging While Drilling".

FIELD OF THE INVENTION

This invention generally pertains to logging while drilling apparatus, systems and methods and more particularly pertains to systems, apparatus, and methods utilizing mud pulsations for telemetry to transmit signals representing one or more downhole parameters to the earth's surface.

BACKGROUND OF THE INVENTION

Many efforts have been made to develop successful logging while drilling systems, as suggested by the following examples: Karcher, U.S. Pat. No. 2,096,279 proposes a system utilizing electrical conductors inside the drill pipe. Heilhecker, U.S. Pat. No. 3,825,078 proposes a system utilizing extendable loops of wire inside the drill pipe. Silverman, U.S. Pat. No. 2,354,887 proposes a system utilizing inductive coupling of a coil or coils with the drill pipe near the drill bit with measurement of the induced electrical potential at the earth's surface. Arps, U.S. Pat. No. 2,787,759 and Claycomb, U.S. Pat. No. 3,488,629 propose systems in which pulsed restrictions to the drilling mud flow produce pressure pulse signals at the earth's surface. Other related U.S. Pat. Nos. are 3,186,222, 3,315,224, 3,408,561, 3,732,728, 3,737,845, 3,949,354 and 4,001,774. All of the foregoing patents are specifically incorporated into this specification by reference.

Each of the abovementioned proposals has had some drawback of sufficient consequence to prevent its commercial acceptance. For example, the inconvenience and time involved for the large number of connections and disconnections of electrical connectors is a significant drawback in systems such as proposed by Karcher. Though an induced electric potential system such as proposed by Silverman may be considered operable for a short distance, the signal to noise ratio of such a system prohibits its use as a practical matter in deep wells.

When modern jet bit drilling became commonplace and very large mud volumes and high mud pressures were employed, the systems as proposed by Arps, proved to be unreliable and subject to rapid deterioration. The introduction of a controlled restriction into the very powerful mud stream, of necessity, required large and powerful apparatus and operation was unsatisfactory because of rapid wear and very high energy requirements.

The environment is very hostile at the bottom of a well during drilling. Drill bit and drill collar vibrations may be in the order of 50 g. The temperature is frequently as much as 400° F. The bottom hole pressure can be more than 15,000 psi. The driling fluid flowing through the drill collars and drill bit is highly abrasive. With present drilling equipment including improved drill bits, the continued drilling time with a particular bit can be in the order of 100–300 hours and sometimes longer before it becomes necessary to change the drill bit. Accordingly, a downhole formation condition sensing and signal transmitting unit mounted near the drill bit must be capable of operating unattended for long periods of time without adjustment and with a continuing source of electrical power. Also, the signal communication apparatus must be capable of transmitting a continuing usable signal or signals to the earth's surface after each additional joint of drill pipe is conventionally added to the drilling string as the drilled borehole is increased in depth.

In general, systems using mud pulsations for telemetry are considered the most practical since the drilling operation is least disturbed. To date, however, the reliability that has been achieved with such systems is not satisfactory. The previous methods such as those of Arps and Claycomb, utilize the insertion of a controlled restriction into the mud flow circuit. However, when the mud flow surpasses 600 gpm and pump pressures pass 3000 psi, controlling this large energy by varying a restriction to produce telemetry signals is complicated and requires powerful downhole machinery.

A general objective of the present invention is to provide a successful logging while drilling system of the type utilizing mud pulsations for telemetry to transmit signals representing one or more downhole parameters to the earth's surface.

More specifically, it is an objective of the invention to provide such a system wherein the amount of energy that is required to generate a strong pressure pulse at a tool near the drill bit is significantly reduced.

Another objective of the invention is the utilization of an existing large source of energy for the production of the mud pulsations.

Another objective of the invention is to provide a satisfactory valve mechanism and arranged to be utilized in the production of the mud pulsations.

Another objective of the invention is to provide a suitable self-contained downhole electric power source to be utilized for actuation of the valve mechanism abovementioned.

Another objective of the invention is to provide effective means for substantially eliminating the effects of interfering mud pulse signals (noise) at the surface equipment.

For a further understanding of the invention and further objects, features, and advantages thereof, reference may now be had to the following description taken in conjunction with the accompanying drawings.

BRIEF DESCRIPTION OF THE DRAWINGS

FIG. 2A is a schematic illustration of a negative mud pressure pulse generator with its valve in the open position.

FIG. 2B is a schematic illustration of the negative mud pressure pulse generator of FIG. 2A, with its valve in the closed position.

FIG. 3A is a schematic illustration of a physical embodiment of the negative mud pressure pulse generator of FIGS. 2A and 2B, together with instrumentation and sensor sections in place in a drill string near the drill bit.

FIG. 3B is a drawing of the negative mud pressure pulse generator of FIGS. 2A and 2B taken in proportional dimensions from an engineering assembly drawing used in actual manufacture of the device.

FIG. 3C is a schematic diagram of a radioactivity type sensor and associated instrumentation.

FIG. 3D is a schematic diagram of a temperature type sensor and associated instrumentation.

FIG. 3E is a schematic diagram of typical instrumentation for controlling actuation of the valve of the negative mud pressure pulse generator.

FIG. 3F is a schematic illustration of one type of self-contained downhole power source that may be utilized.

FIG. 3G is a schematic illustration of another type of self-contained downhole power source that may be utilized.

FIG. 10 is a schematic block diagram showing an alternate timing pulse generator that may be utilized.

FIG. 11 is a schematic block diagram showing still another form of aboveground equipment that may be utilized.

DETAILED DESCRIPTION OF INVENTION

Figure 1:
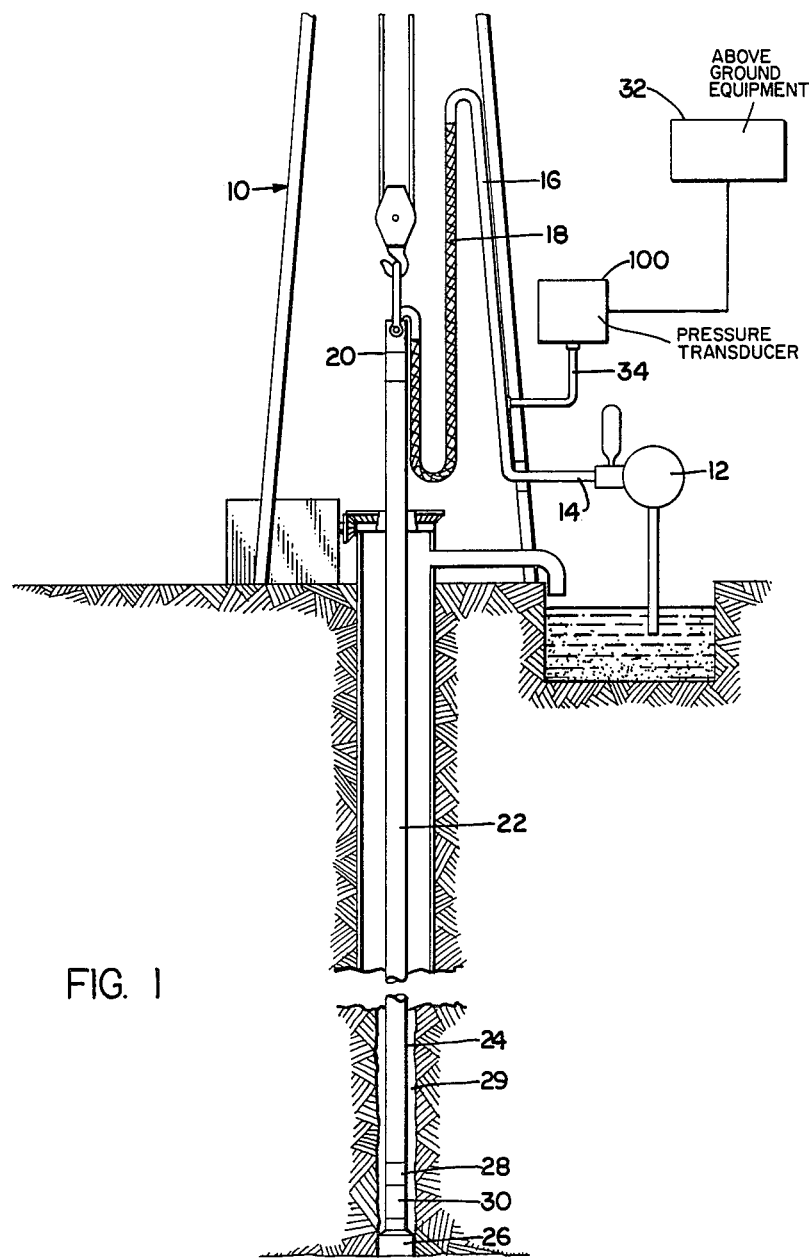
FIG. 1 is a schematic illustration of a conventional rotary drilling rig showing apparatus of the present invention incorporated therein.

Before proceeding with description of preferred embodiments of the invention, it is believed that understanding will be enhanced by discussion of some basic factors.

In a 10,000' length of 4½" drill pipe, the mud volume inside the pipe is of the order of 5,000 gallons. Assuming that the bulk elastic modulus for compressed drilling mud is 400,000, then discharging 0.5 gallons of fluid will cause a pressure drop of 40 psi, (if we consider the 5,000 gallons as being in a simple tank). It can be assumed, therefore, that discharging mud near the bottom of such drill pipe at the rate of 0.125 gallons/sec. will cause a signal of 10 psi/sec. at the surface. We shall refer to the rate of change of pressure as the dp/dt index and in this case the dp/dt index is equal to 10.

Three important experiments were performed;

1. Measurements were made in a test well at 1,800' and moderate differential pressures of 1,000 psi across a valve at the bottom.

2. Measurements were made in an oil field drilling well at 8,000' and low differential pressures of 400 psi.

3. Measurements were made in a second oil field drilling well at 5,000' and high differential pressures (1,600 psi).

All three series of experiments indicated that the dp/dt index of the pressure pulse received at the surface when the valve is suddenly opened was substantially higher than calculated. The reasons for this are: (a) highly compressed drilling mud may have an elastic modulus somewhat higher than 400,000; (b) there is some wave guide action by the drill pipe that causes the signal to travel much more favorably than it would in a large tank of the same volume; and (c) the sudden opening of a valve at the bottom of the well causes a higher dp/dt index than in the case of the large tank because of the elasticity of the mud column above it.

In a typical 15,000 foot drill string (with the bottom end closed off), if a marker were placed at the top of the mud column, this marker would drop some 110 feet when 3,000 psi mud pump pressure is applied (3,000 psi is a rather typical mud pump pressure in deep wells). One can, therefore, consider the mud column as being continually compressed by some 100 feet and acting as a long spring in which a large amount of potential energy is stored. When a valve at the bottom of the drill pipe is suddenly opened, this potential energy is released, causing a large negative mud pressure pulse; such mud pressure pulse being substantially larger than would be the case if the mud were incompressible.

In the experiments conducted at 5,000' in a drilling well, a small passageway (0.056 in.$^2$ area) between the inside of the drill collar and the annulus, was opened and shut in accordance with a controlled sequence. The pressure across the valve was 1,600 psi and the discharge was calculated to be approximately 0.25 gallons/sec. The volume of mud inside the drill pipe was approximately 2,500 gallons and assuming an elastic modulus for the mud of 400,000", the pressure drop was calculated to be 40 psi/sec. (again using the assumption that mud column was a simple tank). In the tests the pressure drop at the surface was measured to be over 100 psi/sec. or considerably more than would be expected from the simple tank calculation. The following conclusion was reached: With high pressures existing across the drill bit (1,000 psi or more), large sharp signals can be developed at the surface by opening and closing a very small bypass valve at the sub-surface near the drill bit. Valves having an opening of 0.05 in.$^2$ can produce large signals from a 5,000' depth and the reduction in signal magnitude from depths between 2,500' and 5,000' have been found to be very small; thus, indicating that the signal attenuation is small.

The system of the present invention has a number of important advantages: The rapid discharge at a rate of as little as 0.125 gallons/sec will generate a "sharp" pulse, that is a pulse containing a high rate of change of pressure, i.e., a high dp/dt index (e.g. 40). Furthermore, the rapid opening of the bypass valve will also minimize wear for the following reasons: When the bypass valve is closed, there obviously is no wear on the valve seat. When the valve is open (and the valve area is large compared to a restriction or restrictions following it), the valve will be exposed to low velocity fluid and, consequently, the wear will be mostly in the following restriction or restrictions which can be made expendable and of very non-errodable material such as boron carbide. Wear occurs in the bypass valve only when it is in the process of opening or closing, i.e., is "cracked" and the velocity through the valve seat is then very high. The valve operation should, therefore, be as fast as possible for opening and closing and there is no limit to the desirable speed. The rate of discharge through the valve should also be fast but there is an upper limit beyond which faster discharge does not benefit. The reason for this is the limit to high frequency transmission through the mud. Frequencies higher than about 100 Hz are strongly attenuated and are of little value in building up a fast pulse at the surface. To determine the maximum useful rate of discharge, it was necessary to set up experiments on a full scale using real drilling oil wells and long lengths of conventional drill pipe. The experimental arrangements comprised a special large valve followed by an adjustable orifice.

Changing the orifice size can determine the flow rate in gallons per second. It was determined that flows larger than about 0.3 gallons per second produced little improvement in the signal. In comparing the signals from a depth of 5,012 feet, three different orifice sizes were tested, 0.509" diameter, 0.427" diameter and 0.268" diameter. It was determined that the 0.268" diameter orifice generated a signal at the surface nearly as intense as the one generated by the 0.509" diameter orifice.

Referring now to FIG. 1, there is schematically illustrated a typical drilling rig 10 including a mud circulating pump 12 connected to a discharge pipe 14, a standpipe 16, a high pressure flexible rotary hose 18, a swivel 20 and a drilling string 22, comprising the usual drill pipe and drill collars, and a jet type bit 26. A short distance above the bit 26, and mounted within drill collar 24, is a negative mud pressure pulse generator 28 and a sensing and instrumentation unit 30.

The negative mud pressure pulse generator 28 is of a special design. It generates a series of programmed pulses and, each pulse consists of a short momentary reduction in mud pressure. In one embodiment, this is accomplished by means including a valve that momentarily opens a passageway between the inside and the outside of the drill collar 24, i.e., the valve controls a passageway between the inside of the drill collar 24 and the annulus 29 formed by the outside of the drill collar and the well bore.

Aboveground equipment, generally designated as 32, is connected to a pressure transducer 100, which in turn is connected to standpipe 16. Alternatively, the transducer 100 could be connected into the stationary portion of swivel 20, if desired.

FIGS. 2A and 2B show the negative mud pressure pulse generator 28 in diagrammatic form to facilitate explanation of its function and manner of operation. The negative mud pressure pulse generator comprises a valve inlet chamber 42, a valve outlet chamber 44, and a compensator chamber 72. The valve inlet chamber 42 is hydraulically connected via an inlet passageway 38 to the inside of the drill collar 24. The valve inlet chamber 42 is also hydraulically connected via a passageway 48 to the valve outlet chamber 44. Hydraulic flow through passageway 48 is controlled by the cooperation of a valve 36 with its seat 37. The valve outlet chamber 44 is hydraulically connected via an outlet passageway 51 to the annulus 29. Interposed in the outlet passageway 51 are first and second compensator orifices 52, 53. The chamber 40 between the orifices 52, 53 is hydraulically connected via a conduit 74 to the compensator chamber 72. The inlet chamber 42 communicates with compensator chamber 72 via a cylinder 49, which receives a compensating piston 50 that is connected to the valve 36 by means of a shaft 46. The valve 36 is also connected, by means of a shaft 47 (see FIGS. 3A and 3B) to an actuator device 54.

The function and operation of the negative mud pressure pulse generator 28 will now be explained. FIG. 2B shows the valve 36 of the negative mud pressure pulse generator 28 in the "closed" condition. In this figure, the striated part indicates "high" pressure and the blank part indicates "low" pressure. (Pressure magnitudes, such as "high", "low" and "intermediate" are relative pressures, i.e., the difference between the pressure at a given location and the annulus pressure which is here considered to be zero; the actual or real pressure would be equal to these magnitudes plus the hydrostatic head, which may be 10,000 psi or higher.)

The effective area of the valve 36 is made somewhat larger than the effective area of the piston 50 on the shaft side and, consequently, when the valve 36 is closed or nearly closed, the force on the shaft 46 is in the direction shown by the arrow in FIG. 2B and may be equal to about 1,000 X (a—a') where a is the effective area of the valve 36 and a' is the effective area of the compensating piston 50 on the shaft side.

FIG. 2A shows the valve 36 in the "open" condition, i.e., permitting mud flow from valve inlet chamber 42 to valve outlet chamber 44 and via outlet passageway 51 to the annulus 29. The first and second compensator orifices 52 and 53 each provide a predetermined restriction to the mud flow and each causes a pressure drop. Consequently, the pressure inside the chamber 72 can be made to have any value between the maximum pressure inside chamber 44 and the minimum value at the exit of outlet passageway 51 which corresponds to the pressure inside the annulus 29.

As is pointed out above, in FIG. 2A as in FIG. 2B, the striated part indicates "high" pressure and the blank part at the exit of outlet passageway 51 is "low" pressure. During the valve "open" flow condition, the mud encounters two restrictions to flow: orifice 52 and orifice 53, as a consequence of which, the pressure in the chamber 40 is intermediate between the "high" pressure indicated by the striated section and the "low" pressure at the exit of outlet passageway 51. This "intermediate" pressure is indicated by the stippled area in FIG. 2A. This "intermediate" pressure is originated in the chamber 40 between orifices 52 and 53 and communicates via conduit 74 to the compensator chamber 72. The pressure in this compensator chamber 72 can, consequently, be adjusted to any reasonable value between the "high" pressure in valve outlet chamber 44 and the "low" pressure at the exit of outlet passageway 51. The proportioning of the sizes of the orifices 52 and 53, therefore, controls the pressure in compensator chamber 72 and, consequently, the force on compensator piston 50. If the orifice 53 were the same size as orifice 52, then the pressure in chamber 40 (and compensator chamber 72) would be about midway between that of valve outlet chamber 44 and the annulus 29. As the size of orifice 53 is made larger than that of orifice 52, the pressure in compensator chamber 72 will be relatively decreased, and as the size of orifice 53 is made smaller than that of orifice 52, the pressure in compensator chamber 72 will be relatively increased. For example, if orifice 53 is made small compared to orifice 52, the pressure in compensator chamber 72 will be high and, therefore, the force on the head of piston 50 will be high and tend to close the valve 36. On the other hand, if orifice 53 is large compared to orifice 52, the pressure in chamber 72 will be low, thus, tending to allow the valve 36 to remain open. It is seen, therefore, that the force on the head of piston 50 can be adjusted between wide limits, thus, providing a means for adjusting the action of the valve 36.

It is important to note that the force tending to close the valve 36 in FIG. 2B, and the force tending to open the valve 36 in FIG. 2A, are determined by first and second independent parameters, i.e., the force tending to close the valve is derived from the effective area differences of the valve 36 and the rod side of compensator piston 50; whereas the force tending to open the valve is derived from the relative sizes of the orifices 52 and 53. By suitably adjusting these parameters, the valve 36 can be made to open or close by the application of a small external mechanical force.

It is also important to note that the valve 36 has a "bi-stable" action, i.e., the valve is "flipped" or "toggled" from the "open" to the "closed" position or vice versa. In other words, the first said independent parameter is chosen so that when the valve is within the region of nearly closed to fully closed, a predominant force of predetermined magnitude in the valve "close" direction is applied and maintained; and the second said independent parameter is chosen so that when the valve is within the region of nearly open to fully open, a predominant force of predetermined magnitude in the valve "open" direction is applied and maintained.

Thus, it is apparent that the negative mud pressure pulse generator 28 of the present invention utilizes existing energy derived from the mud pressure in such a manner so as to greatly reduce the amount of external energy required to operate the valve 36 and, in addition, to impart to the valve 36 a "bi-stable" or "toggle" action.

Further discussion of the negative mud pressure pulse generator 28 will be facilitated by reference to FIGS. 3A and 3B, which will now be described. FIG. 3A illustrates in schematic form a physical embodiment of the negative mud pressure pulse generator 28 and associated downhole equipment as it would be installed in the drilling apparatus of FIG. 1. The reference numerals that are applied in FIGS. 1, 2A and 2B refer to corresponding parts when applied to FIG. 3A. In FIG. 3A, a sub 58, which is typically 6¾" O.D. and 3' long, supports an inner housing 56 by means of arms, or perforated or slotted support members (not shown). The inner housing 56 contains the negative mud pressure pulse generator 28 and carries at its lower end portion instrumentation sections 62, 66 and sensor section 64. The mud from inside the drill collar 24 passes around the housing 56 in the direction of the arrows. A filter 60 prevents mud solids from entering the housing. The valve 36 is shown to be operated by an actuating device 54. When the valve 36 is open, as shown in FIG. 2A, some mud is bypassed into the annulus 29. The bent arrows show the direction of this bypassed mud. The pressure that forces the mud into the annulus 29 is the pressure across the jets of bit 26. When valve 36 is closed, the bypass to the annulus 29 is closed.

The floating piston 76 separates chamber 72 from an oil filled chamber 78. Actuating device 54 is mounted within an oil filled chamber 80. An equalizing passageway 82, connects chamber 78 with chamber 80. Thus, in cooperation with floating piston 76 and passageway 74, the chambers 72, 78 and 80 are maintained at essentially the same pressure as the chamber 40. Passageway 82 is partially shown in dashed lines in FIG. 3A and is not shown in FIG. 3B since it is located in a different plane from the cross section shown.

Numeral 68 represents a standard drill collar and numeral 69 a box-box sub. Section 66 is 2⅜' in diameter and fits into a standard 15' 6¾" O.D.-3¼" I.D. drill collar. The unit 30 is provided with special centralizer arms 70 which fit snugly into box-box sub 69. The centralizer arms 70 are designed to centralize the unit 30 while allowing free passage of mud.

FIG. 3B bears the corresponding reference numerals of FIGS. 2A, 2B and 3A and shows the negative mud pressure pulse generator 28 in sufficient proportion and detail to illustrate to one skilled in the art its actual construction. It may be noted that in FIG. 3B the actuating device 54 comprises a pair of electrical solenoids arranged in opposition. The winding 55 of the upper solenoid is disposed to exert a force in the upward direction on its armature 57, while the winding 59 of the lower solenoid is disposed to exert a force in the downward direction on its armature 61. The armatures 57, 61 are loosely coupled to a mechanical linkage 63 that is fixed to the shaft 47 so that a "hammer" effect is achieved; i.e., when a solenoid winding is energized, its armature moves a short distance before picking up the load of shaft 47 with a hammer like impact. This "hammer" action has a beneficial effect upon the opening and closing operations of the valve 36. Suitable solenoids for this application are the Size 6EC, medium stroke, conical face, type manufactured by Ledex, Inc., of Dayton, Ohio.

Reverting now to discussion of the negative mud pressure pulse generator 28, there are several further factors and features that should be considered.

The orifices 52, 53 are made to have smaller opening areas than that of the passageway 48, so that the velocity of mud flow over the sealing surfaces of valve 36 and its seat 37 is significantly reduced when compared to the velocity of mud flow through the orifices 52, 53; thus, concentrating wear on the orifices 52, 53, which are made of wear resistant material (such as boron carbide) and which are also made readily replaceable in the "field", as indicated in FIG. 3B. These small non-erodable orifices 52, 53 make the negative mud pressure pulse generator 28 completely "fail safe", i.e., no matter what happens to the operation of valve 36 (such as being stuck in the open position) the amount of mud that is allowed to flow through the orifices 52, 53 would have no significant adverse effects on the drilling. A further advantage of making the orifices 52, 53 readily replaceable in the "field" is that they can be charged to best suit varying weights and viscosities of mud.

Because the negative mud pressure pulse generator 28 is exposed to severe vibration forces, the design must provide for stability of the valve 36 in both its open or closed position. The requisite stability is provided by the "hydraulic detent" or "bi-stable" action of the valve 36 which was previously herein described.

The vertical acceleration encountered in drilling is more severe in the upward than in the downward direction. When the teeth of drill bit 26 encounter a hard rock, the drill bit and drill collars 24 are forced upwards, i.e., accelerated in the upward direction; but once the drill bit is raised upward and out of contact with the rock, there is little force other than the acceleration due to gravity that forces the drill bit and drill collars downwardly. Consequently, the acceleration upward can be several hundred g's but the acceleration downward is only of the order of 1 g. The valve 36, therefore, must be designed so that when in the closed position, high upwards acceleration tends to keep it closed, i.e., makes it seat better, and high downward acceleration (assumed to be small) tends to open the valve. This has been accomplished in the design, as can be seen from FIGS. 3A and 3B.

I determined, by conducting various tests and experiments, that a force of approximately 34 pounds would be required to actuate the valve 36 when the first and second independent parameters hereinbefore described had been chosen to provide appropriate "hydraulic detent" or "bi-stable" action to achieve adequate stability for the valve 36. With good engineering safety factors added, the required force became 70-100 pounds. The application of force of this magnitude over the required distance of valve travel, with electromagnetic drive solenoids of reasonable size, would require about 350 watts of electric power; i.e., nearly ½ horsepower. With such a large power requirement it would appear at first glance that the energy needed for the number of actuations of the valve 36 that would be necessary for successful operation would be far beyond the capacity of any available self-contained downhole power source. This apparent energy problem is overcome, however, when it is considered that the negative mud pressure pulse generator 28 of the present invention provides a very rapid action for the valve 36; i.e., the valve 36 can be made to open (or to close) with the application of the required 350 watts for only about 20 milliseconds. The amount of energy required to open (or close) the valve is, therefore, $$(350\cdot 20)/(1000\ 60\cdot 60) \simeq 0.002\ \text{watt hours}$$

There are available modern high density batteries of reasonable size and capable of being included in the space provided within the drill collar 24 and which can easily provide 2,000 watt hours of energy. Therefore (even without recharging, as is described later herein) a reasonable battery can provide enough energy to operate the valve 36 about one million times. Assuming that the valve is operated once every four seconds, a single battery charge is able to operate the valve continuously for over one month. It is an important requirement in logging while drilling that the downhole apparatus be capable of operation unattended (i.e., without battery recharge) for at lease the length of time between "round trips", i.e., the time that a single bit can drill without replacement, the best bits last only about 100—300 hours and, therefore, the 30 day figure above is more than adequate.

The practical design of the negative mud pressure pulse generator 28 is a complex matter. In my experience, although careful calculations were made using much of modern hydrodynamic theory, in the final stages, many of the parameters had to be determined by empirical methods. An important reason for this is because the "viscosity" of drilling mud is thixotropic and the dynamic behavior is quite different from that of liquids having classical or so called Newtonian viscosity. Drilling mud "weight" (grams per cc) and "viscosity" vary over wide ranges and consideration must be given to the fact that "weight" usually varies over a much smaller range than "viscosity". Drilling mud usually contains not only colloidal particles in suspension but also larger grains of sand and other particles.

An experimental set up was designed to determine the minimum size of the discharge orifice (which controls the rate of fluid discharge into the annulus). In this set up, a large "servo" valve (1" diameter) was followed by smaller replaceable orifices. In 8,000' and 5,000' well depth experiments careful measurements were made of the magnitude of the negative mud pressure pulse at the surface as a function of the size of the discharge orifice. As this size was successively reduced, the magnitude of the pulse at the surface seemed almost independent of the size of the orifice until the surprisingly small 0.05 in.$^2$ orifice area was reached, at which time a slight reduction in pulse magnitude was observed. This phenomenon was quite unexpected, but was later understood after careful consideration of the elastic properties of the mud column and the stored potential energy therein as was hereinabove explained. This discovery produced the realization that a small negative mud pressure pulse generator could produce useful signals at the surface. Calculations were thereafter made and it was determined that the "servo" principle for the valve actuation was not necessary and the "servo" valve approach was abandoned. The direct, very fast acting, negative mud pressure pulse generator of this invention was thereupon designed and has proved to be successful.

In a negative mud pressure pulse generator 28 of practical design the following dimensions may be considered as typical: orifice 52, 0.500" in diameter; orifice 53, 0.306" in diameter; stroke of valve 36, 0.125"; diameter of piston 50, 0.383"; diameter of valve 36 at its seating surface, 0.430"; angle of seat 37 relative to axis of valve movement, 60°; diameter of opening at seat 37 or passageway 48, 0.375"; diameter of valve shaft 46, 47, 0.187".

In FIG. 3F there is schematically illustrated a special type of battery that is well adapted to powering the downhole equipment of the present invention.

Deep oil wells frequently have high bottom hole temperatures 300°–400° F. and many electric batteries cannot operate at this temperature. There is, however, an exception; the modern molten salt batteries. They operate well at high temperatures of 400°–500° C. or even higher but will not operate properly at lower temperatures principally because the electrolyte solidifies and ceases to conduct electrically. A lithium aluminum iron sulphide molten salt battery is manufactured by the Eagle Pitcher Co., Joplin Missouri. Other manufacturers also manufacture high energy molten salt batteries that are especially intended for electric vehicle use. These batteries are very well adapted for high temperature operation.

As illustrated in FIG. 3F, I provide an arrangement that will "start up" the battery before it is immersed into the hot environment of the oil well and will maintain it charged when in use. In FIG. 3F, reference numeral 155 designates the battery proper; reference numeral 156 designates heating elements that are arranged to provide a small amount of heating to the battery 155; and reference numeral 157 designates a jacket containing thermal insulation, as for example, a material known as "Super Insulation" manufactured by the Union Carbide Co., New York, N.Y. or "Multifoil", manufactured by The Thermo Electron Co., Waltham, Mass. Initially an external voltage (not shown) is applied to the terminal 158 (while the instrument is at the surface and before immersion into the well). This voltage activates the heating elements 156 and the battery electrolyte melts. Furthermore, the battery 155 is charged by the voltage applied at 158 before the instrument is immersed in the oil well. When the battery 155 is in its normal operating temperature range, the circuit to the heating element 156 is opened by the thermostatic switch 159, which closes during periods when additional heat to the battery 155 is required. When logging while drilling, the vibration of the tool will cause the device 160 to generate a charging current. The device 160 is described in U.S. Pat. No. 3,970,877, Russell, et al, which is made part of this application by reference. Instead of the Russell, et al, device, a small mud flow powered turbine and electric generator could be used to maintain the battery charged, since only about 1 watt of continuous charging power is required.

In FIG. 3G there is schematically shown another special type of battery that may be used to power the downhole equipment of the present invention. This battery preferably uses cells of the Lithium Sulphur type, such as are manufactured by Power Conversion Inc., of Mt. Vernon, N.Y. It may also use LeClanche type cells or Lead Acid type cells. All such cells, if exposed to high temperatures (such as those normally encountered in deep earth boreholes) would develop high internal pressure, so that the cells would tend to explode. In one aspect of the present invention, there is provided an arrangement (illustrated by FIG. 3G) by which this problem is overcome. In FIG. 3G, a plurality of individual cells 161 such as one of the above mentioned types are connected in series between a ground terminal 162 and a positive terminal 163. Each cell preferably is provided a conventional pressure release cap or vent 164. In accordance with the invention, the cells 161 are placed in a container or reservoir 165 which is capable of withstanding pressures exceeding those that could be developed by the electrolyte of the cells 161. Within the reservoir 165 there is placed a liquid 166 having the same or similar pressure-temperature characteristics as the electrolyte, i.e., the liquid 166 will produce vapor pressure (when exposed to elevated temperatures) that is substantially equal to the vapor pressure of the electrolyte in the cells 161. In the simple case of the LeClanche type or Lead Acid type cell, the liquid 166 can be water since the container 165 is hermetic and pressure resistant, the liquid 166 (in this example, water) will never boil—no matter how high the temperature. It will simply build up vapor pressure in the space above the liquid 166 high enough to be in equilibrium with the vapor pressure generated by the hot liquid 166.

The same principle can be used when the cells are of the Lithium Sulphur type, the liquid 166 could be Sulphur Dioxide. The Sulphur Dioxide vapor generated by the cells 161 will always be in pressure equilibrium with the container 165 because the Sulphur Dioxide liquid in this auxilliary container 165 will always generate pressures equal to those generated by the cells 161.

Sulphur Dioxide and water, given as examples above, are often unsatisfactory (a) because Sulphur Dioxide is highly corrosive and because water is an electric conductor and can short out the batteries. An alternative substance is dichlorodifluoromethane, popularly called Freon and manufacuted by E. I. DuPont and Co., Wilmington, Del. Many types of Freons have been developed with almost an unlimited number of thermodynamic properties, i.e., pressure-temperature relations. Other substances can readily be found, such as hydrocarbon vapors, propane or butane or mixtures of vapors and gases. Suffice it to say, that I enclose the battery cells 161 in a container 165 and place in this container a small quantity of a substance having similar pressure-temperature relations to that of the electrolyte in the battery cells 161. In FIGS. 3F and 3G, I show only a small number of cells connected in series. In actuality, a larger number is normally employed. In the manufactured instrument of FIG. 3G, I employ 17 Power Conversion Co. Lithium Sulphur cells.

Another important feature of the present invention is that the length of time the valve 36 is maintained "open" has no relation to the amount of energy required. The only energy required is that expended to actuate the valve 36 to the "open" position. The importance of this feature is fully appreciated from the following consideration:

It has been determined by experiment that in order to provide a strong signal from a depth of 10,000 to 20,000, the valve must remain "open" for about $\frac{1}{2}$ to one second and any electromechanical (solenoid or other) device operating for this length of time would not only require large amounts of energy but would overheat and under well conditions probably burn up from its self generated heat.

As is hereinabove pointed out, two typical sensors are disclosed as examples of the types that can be employed in the operation of the present invention. FIG. 3C illustrates a natural gamma ray sensor and its associated circuitry which in this example is of the analog type. FIG. 3D illustrates a temperature sensor which in this example is of the digital type. Either one of these sensors can be connected to the input terminal of the instrumentation illustrated by FIG. 3E which will be hereinafter described.

With reference to FIG. 3C, a geiger counter 168 is provided with the conventional high voltage supply +HV. The geiger counter 168 generates pulses and is connected through a capacitor 169 to amplifier 171 which generates pulses at its output that correspond to those of the geiger counter 168. A scale of 1024 circuit 172 generates one output pulse for each 1024 geiger counter pulses and its output is shown as pulses have a separation $t_1$. The higher the gamma ray intensity, the higher will be the frequency of the pulses at the output of the scale of 1024 circuit 172 and the smaller will be the time $t_1$.

FIG. 3D illustrates the case of the temperature sensor. The temperature is sensed by a thermistor 173, i.e., a semiconductor that varies in resistance with temperature (it is provided with a suitable power supply, not shown) and it is assumed that the output of the thermister 173 is a DC voltage proportioned to temperature. The amplifier 174 amplifies this DC voltage and impresses it on an analog-to-digital convertor 175 which in turn generates a series of binary bytes, one after the other, each representative of a number proportional to the sensed temperature. The outputs of the power amplifiers 185, 186 are utilized to control energization of the windings of the "back-to-back" coupled solenoids (hereinabove described) to actuate the valve 36. When winding 55 is energized the solenoid armature 57 (see FIG. 3B) is moved upwardly, pushing upwardly on shaft 47 to actuate valve 36 to the "open" position. When winding 59 is energized, the solenoid armature 61 is moved downwardly, pulling downward on the shaft 47 to actuate the valve 36 to the "close" position.

In the sensors utilized in the present invention, the magnitude of the downhole parameter is represented by electric pulses. The sequence of the pulses represents a code (binary or other) and this sequence represents the magnitude of the parameter. FIG. 3E illustrates how each single pulse of this code is processed to operate the valve 36. In FIG. 3E, numeral 177 represents one such pulse which is narrow in time; being only a few microseconds long. This pulse 177 is impressed upon the circuitry contained in block 178. This block 178 contains a so called "one shot" univibrator and suitable inverting rectifying circuits well known in the electronics art and provides (in response to the single input pulse) two output pulses separated in time by $t_1$ (the first pulse is normally time coincident with the input pulse and the second appears later by an amount of time equal to $t_1$) as shown by pulses 179 and 180. These electric pulses 179, 180 are now impressed, respectively, upon the circuitry contained in blocks 181, 182. These two circuits are identical and are so called pulse lengthening circuits, also well known in the electronics art. Each input pulse is lengthened to provide output pulses 183 and 184. These pulses are respectively applied to the "Darlington" power amplifiers 185 and 186 (as manufactured by Lambda Mfg. Co. of Melville, New York, and sold under the type PMD16K100).

In the practical design of the electronic logic and power circuitry of FIG. 3E that I use in this preferred embodiment, I have chosen as constants $t_1 = 500$ milliseconds and $t_2 = 20$ milliseconds. In operation, when a single pulse 177 is impressed on lead 167, the Darlington 185 is turned on for 20 milliseconds and then turned off. Then 500 milliseconds later the Darlington 186 is turned on for 20 milliseconds and then turned off. Thus, the valve 36 is opened for 500 milliseconds without requiring any energy during this period. Energy is required only during the short 20 millisecond periods that are required to actuate the valve 36 to the "open" or to the "close" position. The figures given above are for illustrative purposes only. Suffice it to say that by making the action of the valve 36: (a) very fast and (b) bi-stable; very high pressures and volumes of mud can be valved without the necessity of employing large amounts of energy and as hereinabove described, relatively small energy batteries can operate the valve about one million times.

In a typical embodiment of this apparatus, the weight of the entire valve mechanism 36 of FIG. 2A or 3A, including the solenoid armature 54, shaft 46 and piston 50 is approximately 9 ounces. The valve 36 has been designed to operate at a differential pressure of 1,600 psi and proportioned to operate at optimum performance, including the consequence that the force required to open and shut the valve 36 must exceed the force due to vertical acceleration of all the apparatus near the bit 26.

Assuming a vibration figure of 60 g and the weight of 9 ounces, maximum vertical force on valve 36 due to the vibration of the tool 56 will be about 34 pounds. To be certain that the valve 36 will not open accidentally, the force keeping the valve closed in FIG. 2B and the force keeping the valve open in FIG. 2A must both exceed about 34 pounds. By suitable choice of the first and second independent parameters hereinabove described, a "balanced" condition is achieved. By "balanced" is meant that the force required to open the valve 36 is equal to the force required to close it.

Above ground equipment utilized with the present invention, particularly as to methods and apparatus for eliminating interferring effects that are present in the output of pressure transducer 100, can take various forms, as will now be described.

Figure 4:
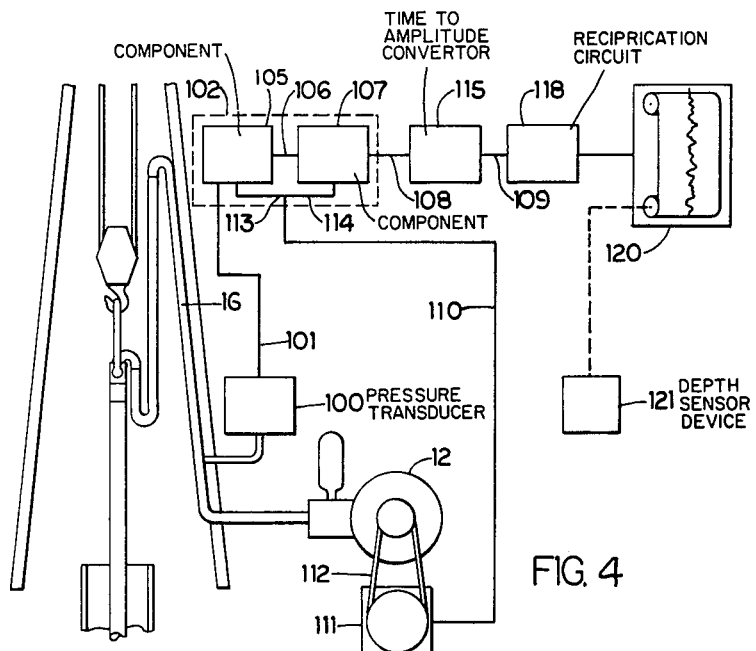
FIG. 4 is a schematic illustration showing typical aboveground equipment in accordance with a preferred embodiment of the invention, wherein the downhole parameter being sensed is radioactivity.

FIG. 4 shows typical above ground equipment in accordance with a preferred embodiment of the invention, wherein the downhole parameter being sensed is the radioactivity of formations traversed by the bore while drilling is in progress. The corresponding portion of the logging equipment which is below the earth's surface has been previously described and shown in FIGS. 2A, 2B, and 3A-G.

Referring now to FIG. 4, pressure transducer 100 connected to the standpipe 16 converts the variation of mud pressure within the standpipe into a varying electrical voltage. This voltage represents a mixture of two component signals: the useful, information carrying signal and the interferring signal. The information carrying signal is a succession of short, negative mud pressure pulses produced by the sudden opening and closing of the valve 36. The interferring signal is in the form of relatively slow and periodic pressure variations which are generated by the strokes of the mud pump 12. These mud pump signals tend to mask or obscure the information one desires to obtain by utilizing the short negative mud pressure pulses.

One of the objectives of this invention is to recover, from the "contaminated" signal produced by the transducer, a "clean" signal which gives the desired information. This is accomplished by means of a signal extractor 102 which is applied to the output terminal 101 of the pressure transducer 100. The signal extractor eliminates the interferring effects and produces across its output terminal 108 a succession of pulses from which the information regarding the downhole parameter can be readily obtained.

The signal extractor 102 is controlled in a predetermined manner by a succession of timing pulses obtained from a pulse generator 111 and applied to the control terminals 113, 114. The pulse generator 111 is mechanically driven by the mud pump 12 to produce an appropriate number of timing pulses per revolution of the pump. A chain drive transmission assembly 112 is provided for this purpose.

The "clean" information carrying signal obtained from the extractor 102 is in the form of pulses derived from the actuation of valve 36 of generator 28. The relevant information is provided by the time intervals separating the pulses. A time-to-amplitude convertor 115 connected to the signal extractor output terminal 108 converts these pulses derived from the actuation of the valve 36 of generator 28 into signals having magnitudes representing the intervals therebetween. The convertor 115 is a well known electronic device and can be made up of components manufactured by the Burr-Brown company of Tuscon, Arizona, U.S.A. For further detailed description of time-to-amplitude converters see: M. Bertolaccini and S. Cova, *"Logic Design of High Precision Time to Pulse Height Converters"*, Nuclear Instruments and Methods 121 (1974), pp. 547-566, North Holland Publishing Co., The signals derived from the convertor 115 are in turn applied to the input terminal 109 of a reciprocation circuit 118. The reciprocation circuit 118 (as, for example, manufactured by Analog Devices, Inc. of Norwood, Mass.) produces output voltages which are the reciprocals of the input voltages. Thus, if a voltage of magnitude M is applied to reciprocation circuit 118, an output voltage having magnitude 1/M is obtained. These signals having magnitudes 1/M are in turn recorded on the chart of a recorder 120. The record chart of recorder 120 is moved in correlation with changing depth of the sensor unit 30 by a depth sensing device 121. The depth sensing device may be, for example, a modification or adaptation of equipment such as marketed by The Geolograph Medeavis Company of Oklahoma City, Okla., U.S.A.

Figure 5:
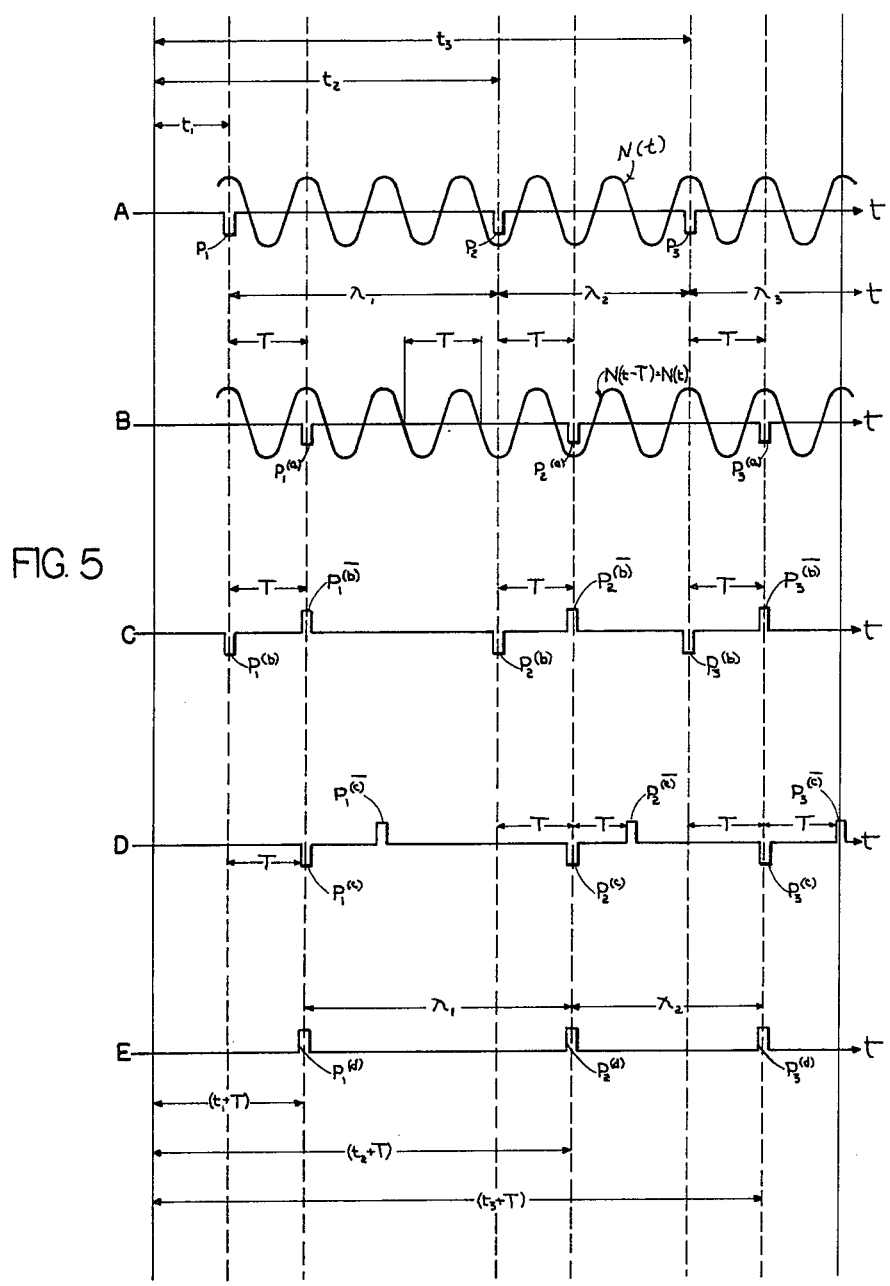
FIG. 5 is a graphic illustration, in idealized form, showing certain wave forms and pulses and time relationships to aid in explanation of the signal extractor portion 102 of FIG. 4.

In order to show more clearly the operating features of the signal extractor 102, we will analyze the behavior of the various signals which are involved. They are shown schematically in a simplified and idealized form as they vary with time in FIG. 5. Let $$F(t) = S(t) + N(t) \qquad (1)$$

where S(t) is the useful information carrying signal formed by the negative mud pressure pulses $P_1$, $P_2$, and $P_3$ aligned along the time axis t. [See FIG. 5 (axis A)] The times of arrival of these pulses, which correspond to the times of actuation of the valve 36 of generator 28, are $t_1$, $t_2$ and $t_3$, respectively. The time intervals which separate these pulses are $\lambda_1 = t_2 - t_1$, $\lambda_2 = t_3 - t_2$, $\lambda_3 = t_4 - t_3$, etc. are indicative of the intensity of the radiation measured. If these time intervals are large, the intensity is relatively weak and conversely, if they are small, the intensity is relatively strong. The interfering signal produced by the mud pump 12 is represented in FIG. 5 (axis A) by a periodic but not necessarily sinusodal function N(t) having a period T. The length of the period is related to the speed of rotation of the pump.

To facilitate explanation, the relative scales in FIG. 5 have been distorted. In actual practice, there may be 50 to 80 oscillations of N(t) between the time of arrival of $P_1$ and $P_2$. Thus, $\lambda_1$ and $\lambda_2$ may vary from 50T to 80T. However, in FIG. 5 (axis A) only a few oscillations of N(t) between $P_1$ and $P_2$ have been shown. Furthermore, in actual practice the negative mud pressure pulses $P_1$, $P_2$, $P_3$ do not have clean rectangular forms as in FIG. 5 (axis A). Moreover, the actual pulses are much smaller than those which have been shown in FIG. 5 (axis A). In actual experience, the magnitude of $P_1$, $P_2$ or $P_3$ is about 0.1 to 0.01 of the maximum amplitude of the pulsations N(t).

Axes A-E in FIG. 5 are positioned one below the other so that one can compare the signals in their time relationships one to another. Using these figures, we can now enumerate the instrumental steps which are involved in the operation of the signal extractor 102. These are as follows:

Step 1 We displace the input F(t) by an amount T, to obtain $$F(t-T) = S(t-T) + N(t-T) \quad (2)$$

where S(t=T) and N(t−T) are, respectively, the displaced useful signal and displaced interfering signal. Both signals are shown in FIG. 5 (axis B). The signal S(t−T) is represented by pulses $P_1^{(a)}$, $P_2^{(a)}$ and $P_3^{(a)}$ which have been obtained by displacing by an amount T the corresponding pulses $P_1$, $P_2$ and $P_3$ in FIG. 5 (axis A). The signal N(t−T) in FIG. 5 (axis B) is shown to be in exact synchronism with N(t) in FIG. 5 (axis A). This is due to the periodicity of the signal. Thus, $$N(t-T) \equiv N(t) \quad (3)$$

Step 2 We substract the displaced input function F(t−T) from the original input function F(t) to obtain $$M(t) = F(t) - F(t-T) \quad (4)$$

Taking into account (1), (2) and (3), we obtain $$M(t) = S(t) - S(t-T) \quad (5)$$

Thus, the interfering signal has been eliminated and does not appear in M(t). This can also be seen from inspection of FIG. 5 (axes A and B).

As shown in FIG. 5 (axis C), M(t) consists of impulses which occur in pairs. Each pair contains a negative and a positive pulse separated one from another by a time interval T. Thus, we observe a pair consisting of $P_1^{(b)}$ and $P_1^{\overline{(b)}}$ which is followed by a succeeding pair consisting of $P_2^{(b)}$ and $P_2^{\overline{(b)}}$, then by another pair consisting of $P_3^{(c)}$ and $P_3^{\overline{(c)}}$ and so on.

Step 3 We displace M(t) by a time T so as to obtain M(t−T). Thus, the entire sequence of pulses in FIG. 5 (axis C) is shifted along the time axis by T so as to appear as shown in FIG. 5 (axis D). The arrangement of pulses as in pairs has been preserved in FIG. 5 (axis D). However, each pair such as $P_1^{(c)}$ and $P_1^{\overline{(c)}}$ is displaced with respect to the pair $P_1^{(b)}$ and $P_1^{\overline{(b)}}$ [shown in FIG. 5 (axis C)] by T. Similarily, the pair $P_2^{(c)}$ and $P_2^{\overline{(c)}}$ is displaced with respect to the pair $P_2^{(b)}$ and $P_2^{\overline{(b)}}$ by T, and so on.

Step 4 We compare the displaced pulses in FIG. 5 (axis D) with those in FIG. 5 (axis C). We note that some of these in FIG. 5 (axis D) are in time coincidence with some of the pulses in FIG. 5 (axis C). The instances at which coincidence occurs are recorded in FIG. 5 (axis E) as pulses $P_1^{(d)}$, $P_2^{(d)}$ and $P_3^{(d)}$. Thus, $P_1^{(d)}$ coincides with $P_1^{\overline{(b)}}$ and $P_1^{(c)}$
$P_2^{(d)}$ coincides with $P_2^{\overline{(b)}}$ and $P_2^{(c)}$
$P_3^{(d)}$ coincides with $P_3^{\overline{(b)}}$ and $P_3^{(c)}$ The times at which the pulses $P_1^{(d)}$, $P_2^{(d)}$ and $P_3^{(d)}$ occur are $t_1 + T$, $t_2 + T$ and $t_3 + T$.

The pulses $P_1^{(d)}$, $P_2^{(d)}$ and $P_3^{(d)}$ correspond to the pulses $P_1$, $P_2$ and $P_3$ shown in FIG. 5 (axis A). Consequently, the pulses in FIG. 5 (axis E) also represent this useful function which now is S(t-T) since it has only been displaced by T. It is evident that the pulses in FIG. 5 (axis E) provide the information which we are seeking to obtain. The time interval between $P_1^{(d)}$ and $P_2^{(d)}$ is $\lambda_1$, and the time interval between $P_2^{(d)}$ and $P_3^{(d)}$ is $\lambda_2$, etc.. The quantities $\lambda_1$, $\lambda_2$, etc. are indicative of the radiation measured by the gamma ray detector.

Figure 6:
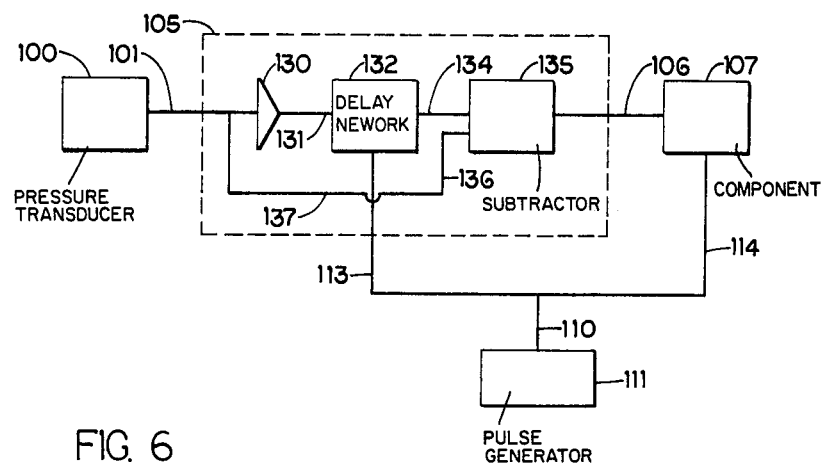
FIG. 6 is a schematic block diagram showing component 105 of the signal extractor 102 of FIG. 4 in further detail.
Figure 7:
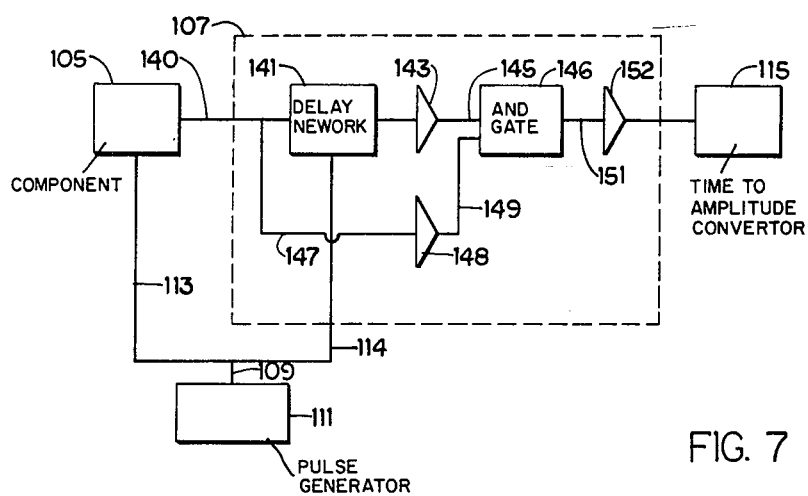
FIG. 7 is a schematic block diagram showing component 107 of the signal extractor 102 of FIG. 4 in further detail.

The above steps will now be considered as they relate to the performance of the signal extractor 102 and more particularly to that of its two component parts designated in FIG. 4 as 105 and 107 and shown schematically in FIGS. 6 and 7, respectively.

The component 105 receives at its input terminal 101 (which is the same as that of the signal extractor 102 of FIG. 4) the signal F(t). As shown in FIG. 6, this signal is transmitted through an amplifier 130 to the input terminal 131 of a delay network 132. The delay network delays F(t) by T, thus, producing at its output terminal 134 the signal F(t−T). This signal is a sum of two component signals S(t−T) and N(t−T) which are shown in FIG. 5 (axis B).

The signal F(t−T) is applied to one input terminal 134 of a subtractor 135. The other input terminal 136 of the subtractor receives directly the signal F(t), which is transmitted from terminal 101 by means of conductor 137. Thus, at the output terminal 106 of the subtractor 135 we obtain the difference signal M(t)=F(t)−F(t−T). This is shown in FIG. 5 (axis C).

The delay network 132 is provided with control terminal 113 which receives a signal controlling the delay T. It is important that the length of the delay T be the same as the period of mud pressure oscillations produced by the mud pump 12.

The amount of the delay T is controlled by the timing impulses derived from pulse generator 111 shown also in FIG. 4 and applied via conductor 110 to the control terminal 113. It is noted that the delay T is the same as the period of oscillation of mud pressure produced in the successive strokes of the mud pump 12. Consequently, the frequency of these timing pulses must be controlled by the rotation of the pump.

Assume that the pump produces $N_1$ strokes per second. Thus, $T=1/N_1$. The pulse generator 111 produces timing pulses at a relatively high rate $N_2$, which is a multiple of $N_1$. Thus, $N_2=KN_1$, where K is a constant which has been chosen to be 512. Thus, if the strokes of the pump are one per second this would require the signal generator to produce 512 pulses per second. It is apparent that the rate of pulsation of the mud pump 12 varies with time and, accordingly, $N_2$ will vary so as to insure that the delay produced by delay network 132 will always be equal to one period of the mud pressure oscillations produced by the mud pump 12.

The delay network 132 which is controlled, as described above, may be a Reticon Model SAD-1024 Dual Analog Delay Line as marketed by Reticon Corporation, Sunnyvale, California, U.S.A..

The instrumental steps herebefore described are the steps 1 and 2 performed by the component 105 of the signal extractor 102. We have transformed the input signal F(t) [represented by its components in FIG. 5 (axis A)] into an output signal M(t) which appears as a succession of pairs of pulses and is shown in FIG. 5 (axis C). We will now proceed to describe further instrumental steps which are required in order to accomplish the desired objectives. These are performed by the component 107 of the signal extractor 102.

We refer now to FIG. 7. The signal M(t) is now applied through conductor 140 to a delay network 141. This delay network is identical to that designated as 132 in FIG. 6. It receives, at its control terminal 114, the same control signal which was applied to the control terminal 113 of the delay network 105. Consequently, the amount of delay produced by delay network 141 is T and the signal appearing at the output of 141 is $M(t-T)$ as shown in FIG. 5 (axis D). This output signal is transmitted through an amplifier 143 to one input terminal 145 of an AND gate 146. At the same time, the undelayed signal M(t) is applied through the conductor 147 and amplifier 148 to the other input terminal 149 of the AND gate 146. These two input signals M(t) and $M(t-T)$ which are applied to the AND gate 146 are shown in FIG. 5 (axes A and D) respectively. We have previously observed that some impulses shown in FIG. 5 (axis C) occur in coincidence with impulses in FIG. 5 (axis D). Those impulses that occur in coincidence appear in the output of the AND gate 146. They are designated in FIG. 5 (axis E) as $P_1^{(d)}$, $P_2^{(d)}$ and $P_3^{(d)}$. These coincident pulses are the output of pulses of the component 107, and consequently of the signal extractor 102.

It is thus apparent that by means of the component 107, we have performed the instrumental steps 3 and 4. We have transformed the signal M(t) shown in FIG. 5 (axis C) into the signal $S(t-T)$ shown in FIG. 5 (axis E). The latter provides the quantities $\lambda_1$, $\lambda_2$, $\lambda_3$, etc., which represent the information it was desired to obtain. It should be recalled that the signal $S(t-T)$ is represented by a succession of pulses as shown in FIG. 5 (axis E). These pulses are transmitted to the time-to-amplitude converter 115 to produce at the output of the time-to-amplitude convertor 115 signals of various magnitude such as $\lambda_1$, $\lambda_2$, $\lambda_3$, etc., that represent time intervals between the arrival of pulses. These signals are in turn fed to and transformed by the reciprocation circuit 118 of FIG. 4 into other reciprocal signals having magnitudes $1/\lambda_1$, $1/\lambda_2$, $1/\lambda_3$, respectively. These reciprocal signals are recorded by recorder 120 of FIG. 4. It is apparent that the quantities $1/\lambda_1$, $1/\lambda_2$ and $1/\lambda_3$ represent the intensity of radioactivity of formations sensed by the sensor unit 30 at various depths in the borehole.

Figure 8:
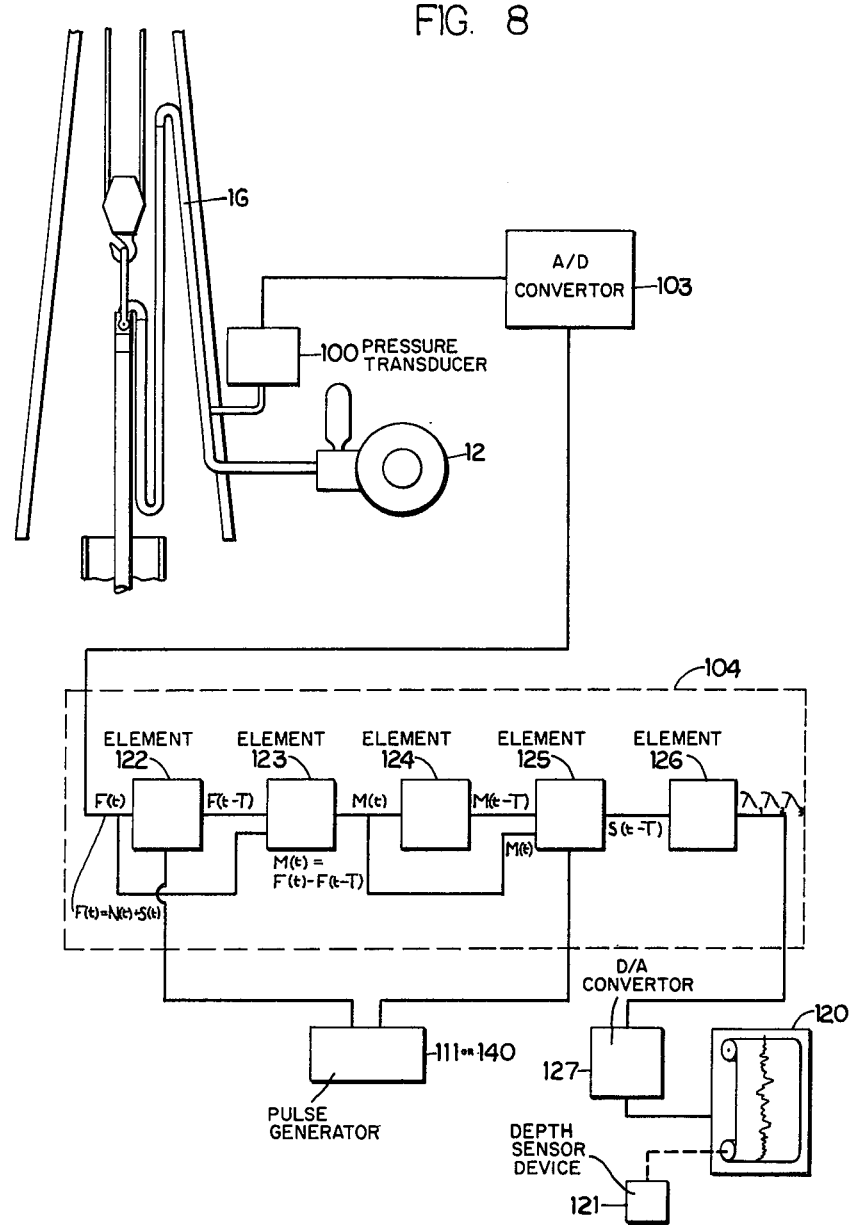
FIG. 8 is a schematic block diagram showing another form of aboveground equipment that may be utilized.

We have described above an instrumental means for performing logical steps leading from the function F(t) to a function $S(t-T)$. These steps have been performed by representing these functions in an analog (non-digital) form. Alternatively, if desired, the entire process can be digitalized, as shown diagramatically by FIG. 8. In FIG. 8, the output of the pressure transducer 100 is fed to an analog-to-digital converter 103, the output of which is fed to a digital computer 104. The operations indicated in FIG. 8 are performed by the elements designated 122, 123, 124, 125 and 126 in the digital computer 104. Timing signals from a pulse generator 111 or 140 are introduced to the digital computer 104 in order to control the delays in accordance with the pump speed. The operations indicated in the dotted rectangle of FIG. 8 are performed mathematically in a sequence which may be flow charted. The output of the computer 104 is fed to a digital-to-analog convertor 127, the output of which is fed to the recorder 120.

Figure 9:
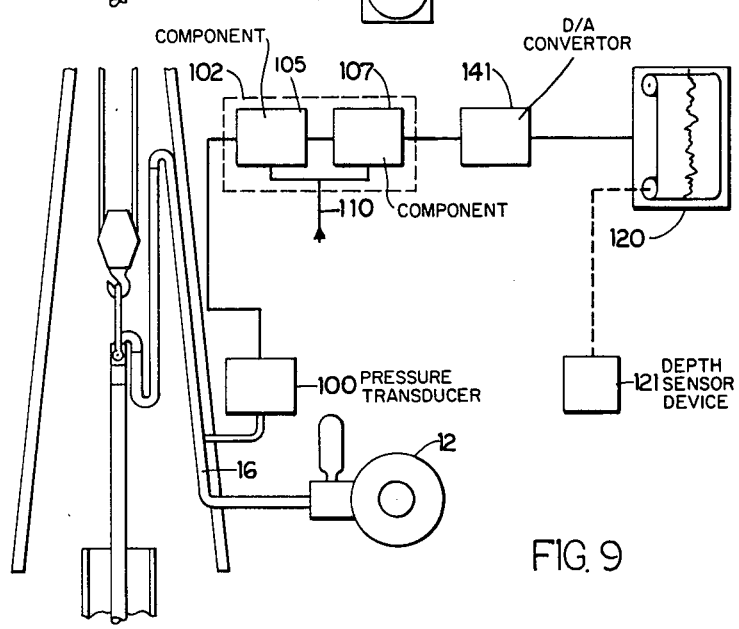
FIG. 9 is a schematic block diagram showing still another form of aboveground equipment that may be utilized.

In FIG. 9, there is shown an arrangement similar in some respects to that of FIG. 4, but wherein the data to be obtained and recorded are the temperature at the location of sensor unit 30 of FIG. 1. In FIG. 9, these data, as presented to the signal extractor 102 are in digital form (see FIG. 3D). The signal extractor 102 of FIG. 9 is identical to that of FIG. 4, but the time-to-amplitude convertor 115 and the reciprocation circuit 118 of FIG. 4 are replaced by a digital-to-analog convertor 141. The output signals of an appropriate pulse generator will be applied to the control terminal 110 of the signal extractor 102.

It is not always convenient to provide a mechanical connection to the mud pump 12, as shown by the chain drive transmission assembly 112 in FIG. 4, and an alternate means for generating the pulses required for the signal extractor may be desirable. FIG. 10 illustrates such an alternate means. In a typical example, the signal extractor 102 of FIG. 4 is provided at its terminal 110 with pulses at a rate of 512 pulses per full pump stroke. It must be clearly understood that this rate must be rigorously synchronized with the pump strokes. All the "times" shown as T, $t_1$, $t_2$, etc. in FIG. 5 are not so-called "real time", but are directly related to the speed of the mud pump 12 and rigorously, T, $t_1$, $t_2$, etc. should be expressed, not in seconds or minutes of "time" but in "gallons of mud". When it said that at terminal 110 of FIG. 4, there are 512 pulses per mud pump stroke, it is meant that at terminal 110 there are present voltage pulses having a frequency equal to the 512th harmonic of the pump stroke frequency. FIG. 10 shows how this can be accomplished without mechanical connection to the pump shaft.

In FIG. 10, component 145 is a VCO or "voltage controlled oscillator" which at its output 110 produces electric pulses the frequency of which is controlled by the DC voltage applied at its input terminal 108. Component 150 is a binary divider or scaler that divides the frequency of the pulses impressed on its input terminal 116 and generates output pulses at its output terminal 117 having a frequency equal to 1/512th of frequency of the input pulses. Component 119 is a phase comparator that compares two inputs (one from scaler output terminal 117 and one from the output terminal 130 of pressure transducer 100), and provides at its output terminal 128 a voltage which is zero volts DC when the two inputs 117 and 130 are exactly equal in phase; and provides a positive voltage when the input at 117 leads the input at 130 in phase; and a negative DC voltage when the input at 117 lags the input at 130 in phase. A battery 129 is provided to properly bias the VCO 145. The circuit 151, just described, is known as "phase locked loop". The operation is best explained by an example: Assume that the pump pulse frequency (pump stroke frequency) is 1 Hz and the VCO is generating 512 Hz. The output of the scaler 150 will then generate exactly 1 Hz. The 1 Hz from the scaler 150 and the 1 Hz from the pressure transducer 100 will then be exactly matched in frequency and phase and the output of the comparator at terminal 128 will be zero volts, and the VCO 145, when properly biased by battery 129, will generate exactly 512 pulses per stroke.

Assume now that the mud pump 12 speeds up. The frequency at terminal 130 will than be somewhat greater than 1 Hz—i.e., $1 + \Delta_1$ Hz. The comparator 119 will then provide an output at terminal 128 which will no longer be zero volts DC, but for example, $+\Delta_2$V, this small voltage increment will be applied to the VCO 145 at terminal 108 and increase its frequency until the nominal 512 pulses per second is increased to a value f such that $f/512 = 1 + \Delta_1$.

Thus, the frequency at terminal 110 will always accurately follow the frequency of the mud pump 12 and will always be its 512th multiple.

Two arrangements for obtaining timing pulses for the signal extractor 102 have been hereinabove described (pulse generator 111 of FIG. 4 and the "phase locked loop" circuit 151 of FIG. 10). A third arrangement that may be used for obtaining such timing pulses is illustrated by FIG. 11 and is based on "auto-correlation". In FIG. 11, the input terminal 154 of a correlator 152 is supplied by the output of the pressure transducer 100, and receives the function F(t) which contains the periodic signal N(t) and the function S(t) which may be considered a random function. The output of the pressure transducer 100 is also applied to the input terminal 101 of the signal extractor 102. The correlator 152 is adapted to produce across its output terminals the auto-correlation function of F(t) which is $$\phi_{ff}(\tau) = \overline{[S(t)][S(t+\tau)+N(t+\tau)]} \quad (6)$$

Where the bar in the above expression indicates averaging over an appropriate period of time. The function $\phi_{ff}(\tau)$ can be expressed as $$\phi_{ff}(\tau) = \phi_{ss}(\tau) + \phi_{nn}(\tau) \quad (7)$$

where
$$\phi_{ss}(\tau) = \overline{S(t)S(t+\tau)} \quad (8)$$

and
$$\phi_{nn}(\tau) = \overline{N(t)N(t+\tau)} \quad (9)$$

The function $\phi_{ss}(\tau)$ reaches zero at some value of $\tau = \tau_o$ and beyond $\tau_o$, we have $$\phi_{ff}(\tau) = \phi_{nn}(\tau) \quad (10)$$

Since $\phi_{nn}(\tau)$ is periodic, the function $\phi_{ff}(\tau)$ is also periodic and it has the period $\tau$. This function, which is obtained in the output of the correlator 152 is in turn applied to a pulse multiplier 153 which produces a succession of timing pulses similar to those produced by the pulse generator 111 in FIG. 4 and which are applied to input terminal 110 of the signal extractor 102. The pulse multiplier 153 multiplies the frequency of the input pulses by a phase locked loop system similar to that of FIG. 10 or by any other conventional means. The remaining elements in FIG. 11 are the same as those in FIG. 4, except, of course, that the pulse generator 111 and its chain drive transmission assembly 112 are eliminated.

There are commercially available instrumental means based on auto-correlation for recovering a periodic signal from a mixture of a periodic and a random signal (see, for example, *Statistical Theory of Communications*, by Y. W. Lee, John Wiley, New York, N. Y., 1960, pp. 288–290). The correlator 152 of FIG. 11 may be Model 3721A manufactured by Hewlett Packard Company of Palo Alto, California. The correlator 152 could also be one of the types described in the following references: A. E. Hastings and J. E. Meade "A Device for Computing Correlation Functions", *Review of Scientific Instruments*, Vol. 23, 1952, pp. 347–349; and F. E. Brooks, Jr. and H. W. Smith, "A Computer for Correlation Functions", *Review of Scientific Instruments*, Vol. 23, 1952, pp. 121–126.

The steps for carrying out one method of the present invention can be stated as follows:

(a) inserting a drill string into said borehole and circulating drilling fluid so that a substantial fluid pressure drop is produced at a localized region in said borehole;

(b) sensing the magnitude of a downhole parameter in said borehole and generating a sequence of electric pulses, the sequence being representative of the magnitude of said parameter;

(c) generating sequential negative drilling fluid pressure pulses responsively to said electric pulses; and, (d) detecting said sequential pulses at the surface of the earth; generating a signal responsively thereto and translating said signal into an indication representative of said magnitude.

While I have shown my invention in several forms, it will be obvious to those skilled in the art that it is not so limited, but is susceptible of various changes and modifications without departing from the spirit thereof.

I have disclosed herein, as examples, sensors for only two downhole parameters, it is, however, to be understood that sensors for various other downhole parameters could be used as well. It is also to be understood that sensors for a plurality of downhole parameters may be used at the same time, in which case, conventional techniques would be employed (such as time sharing, multiplexing, or the like) to handle the data representing the plurality of parameters.

When deviated or inclined wells are drilled, a turbine or "mud motor" such as a Dynadrill, manufactured by Smith Industries, Inc., Houston, Texas, is frequently employed. In such case, the drill string 31 of FIG. 1, is not rotated by the rotary table at the surface. The rotating action to turn the bit 26 is derived from such a mud motor, which usually is located immediately above the bit 26 in the drill string comprising elements 22, 24, 28, 30, of FIG. 1. When such a mud motor is employed, a large pressure drop occurs across it (since the mud motor derives its power from the mud flow). This large pressure drop can be utilized to supply the pressure difference between the inside of the drill string and the annulus and, in such case, a "jet" type bit need not be employed.

The presence of the pressure drop across the mud motor merely enhances the operation of my invention so long as the negative mud pressure pulse generator is located above the mud motor.

The term "flow restriction means", for purposes herein, applies to either a jet type bit, or a mud motor, or both. The term "high pressure zone" applies to the drilling fluid pressure on the upstream side of the "flow restriction means" and the term "low pressure zone" applies to the drilling fluid pressure on the downstream side of the "flow restriction means".

It is recognized that, in some instances, a plurality of mud pumps are employed on a single drilling rig and these pumps are not necessarily operated in synchronism.

In an example of three pumps, the periodic pressure curve of FIG. 5A would, in the practical case, not be a simple periodic function as shown by N(t) but would be the sum of three components, each component being periodic and having its own distinct period.

By the employment of three delay systems, as shown in FIG. 6, each synchronized with its own pump, each periodic component of the interfering mud pulse pressure signal can be separately nullified. Suitable interconnection will then produce a signal from which the interfering mud pump pressure signals are eliminated.

The foregoing disclosure and the showings made in the drawings are merely illustrative of the principles of this invention and are not to be interpreted in a limiting sense.

I claim:

1. For use in a system for conducting drilling operations employing a string of drill pipe extending from the earth's surface having a drilling means at the lower end, a pump by which drilling fluid is forced downwardly through the drill string interior and drilling means to flow back to the surface through the well annulus, the drilling means imposing a restriction to the drilling fluid flow forming a high pressure zone in the interior of the drill string and a low pressure zone in the well annulus, a telemetering system comprising a drilling fluid bypass above the drilling means providing fluid communication between the interior of the drill string and the well annulus, the bypass having an inlet portion within said drill string and being defined in part by a valve seat having an inlet and outlet, a valve stem moveable to and away from the inlet end of said valve seat and in a linear path within said drill string forming a valve in said bypass, the bypass having an outlet portion extending from the outlet end of said valve seat to said annulus, a means for detecting the magnitude of a downhole parameter and for producing an electrical signal comprising a succession of electrical pulses which are arranged in a sequence having a time distribution representing said magnitude, an electrical energy source, means responsive to each said electrical pulse for supplying a relatively large amount of electrical power to initiate opening said valve, and substantially less power when the valve is open or closed, to generate pressure pulses in the drilling fluid, and means at the earth's surface to detect such pressure pulses and to provide a measure of the magnitude of said parameter.

2. For use in a system for conducting drilling operations employing a string of drill pipe extending from the earth's surface having a drilling means at the lower end, a pump by which drilling fluid is forced downwardly through the drill string interior and drilling means to flow back to the surface through the well annulus, the drilling means imposing a restriction to the drilling fluid flow forming a high pressure zone in the interior of the drill string and low pressure zone in the well annulus, a telemetering system comprising a drilling fluid bypass above the drilling means providing fluid communication between the interior of the drill string and the well annulus, the bypass being defined in part by a valve seat, a valve stem moveable to and away from said valve seat forming a valve to close and open said bypass, a means for detecting the magnitude of a downhole parameter and for producing an electrical signal comprising a succession of electrical pulses which are arranged in a sequence having a time distribution representing said magnitude, a cylinder in communication with the bypass having a compensating piston therein connected to said valve stem so that fluid pressure exerts a first hydraulic force on the compensating piston in the direction corresponding to the opening of the valve and fluid pressure exerts a second hydraulic force on the valve stem in the direction corresponding to the closing of the valve, the net hydraulic force on the valve stem being proportional to the difference between said first force and said second force, and means responsive to said electrical pulses to rapidly actuate said valve stem to generate pressure pulses in the drilling fluid, and means at the earth's surface to detect such pressure pulses and to provide a measure of the magnitude of said parameter.

3. A telemetering system according to claim 1, or 2 wherein said means for detecting the magnitude of a downhole parameter is a surveying instrument for measuring hole deviation.

4. The telemetering system according to claim 1 or 2 wherein said means for detecting the magnitude of a downhole parameter is an analog type sensor which generates a voltage indicative of said magnitude, said voltage being impressed on a translator means which generates electric pulses having a distribution in time representative of said voltage.

5. The telemetering system according to claim 1 or 2 wherein said valve is actuated by electromagnetic solenoid means.

6. A telemetering system according to claim 1 or 2 wherein each said electrical pulse produces a first voltage change to open said valve and a second voltage change to close said valve.

7. A telemetering system according to claim 1 or 2 wherein there is provided means for applying force to said valve to accomplish transition from the closed to the open condition in a time of less than 20 milliseconds.

8. A telemetering system according to claim 1 or 2 in which the rate of flow of the drilling fluid through said bypass is at least 0.125 gallons per second when said valve is made to open in at most 20 milliseconds to thereby produce sharp pressure pulses in the drilling fluid.

9. A telemetering system according to claim 1 or 2 including means for maintaining said valve in an open condition in the absence of an actuating signal.

10. A telemetering system according to claim 1 or 2 including means for maintaining said valve in a closed condition in the absence of an actuating signal.

11. A telemetering system according to claim 1 or 2 in which said valve is urged to the closed condition by force extraneous to that provided said electric energy source.

12. A telemetering system according to claim 1 or 2 wherein said valve is urged to a closed condition by force of drilling fluid flow through said bypass.

13. A telemetering system according to claim 5 wherein said electromagnetic solenoid means is arranged to apply force to move said valve from the closed to the open condition.

14. A telemetering system according to claim 5 wherein said electromagnetic solenoid means is arranged to apply force to move said valve from the open to the closed condition.

15. A telemetering system according to claim 5 wherein with said electromagnetic solenoid means there is provided armature means that is loosely coupled by a mechanical linkage to said valve stem such that when said solenoid means is energized said armature means will move a short distance before picking up the valve stem load.

16. A telemetering system according to claim 1 or 2 including fluid filter means in said fluid bypass between said drill string interior and said valve.

17. A telemetering system according to claim 1 or 2 wherein said valve stem is above said valve seat, whereby upward acceleration of said drill string urges said valve towards the closed condition.

18. The telemetering system according to claim 2 including means of subjecting the side of said compensating piston opposite said valve to the pressure of the fluid downstream of the valve.

19. A telemetering system according to claim 2 wherein said net hydraulic force urges the valve to the closed condition when the valve is near fully closed.

20. A telemetering system according to claim 2 wherein said net hydraulic force urges the valve to the open condition when the valve is near fully open.

21. A telemetering system according to claim 1 including orifice means disposed between said valve seat and said well annulus to produce when the valve is open, an intermediate pressure zone, and means to connect said intermediate pressure zone with the side of said compensating piston opposite said valve stem, with the effective area differences between said valve stem and said piston and the relative sizes of said orifice means being selected such that said valve stem can be actuated to the open or closed position by application of forces of reduced magnitudes.

22. A telemetering system according to claim 1 or 2 wherein said drilling fluid bypass is defined by a valve inlet chamber and a valve outlet chamber, the inlet chamber being in communication with said drill string interior, said valve seat being between the inlet and outlet chambers, an outlet passageway connecting the outlet chamber with said well annulus, and wherein said orifice means are in the outlet passageway providing said intermediate pressure zone.

23. A telemetering system according to claim 5 including means providing electromagnetic solenoid actuating current signals responsive to said magnitude representing electrical signals and including means wherein said valve when maintained in the open condition employs electric currents whose magnitudes are less than the electric current magnitudes initially applied to actuate said valve.

24. The system according to claim 1 or 2 wherein for each said electrical pulse, power to initiate opening of said valve is applied for a preselected time interval.

25. The system according to claim 1 or 2 wherein for each said electrical pulse, power to initiate closing of said valve is applied for a preselected time interval.

26. The system of claim 1 or 2 wherein said valve is closed in a predetermined time interval after the valve is opened.

27. A telemetering system according to claim 1 or 2 wherein said means for detecting the magnitude of a downhole parameter produces a succession of electrical current pulses which are impressed on a pulse storage means which in turn generates said electrical signal comprising a succession of electrical pulses which are arranged in a sequence having time distribution representing said magnitude.

28. The system of claim 1 or 2 wherein said pressure pulses in said drilling fluid are superimposed upon interfering pressure variations resulting from at least one of said drilling operations and wherein said means at the earth's surface comprises a first means for producing a first signal representing said superposition, a second means for producing a second signal representing said interfering pressure variations, and a third means employing said first and second signals to detect said pressure pulses and to provide a measure of the magnitude of said parameter.

29. The telemetering system according to claim 1 or 2 in which said pump is operated in accordance with a periodicity which varies with time thereby producing in said drilling fluid corresponding interfering pressure variations, said variations being superimposed upon said information carrying pressure pulses and wherein said detecting means at the earth surface includes a first means to detect said superposition to produce a first signal representing said superposition, and a second means operated in a definite relationship to the variations of periodicity of said pump with time for providing a signal in which the effect of said variation is substantially attenuated thereby accentuating said pressure pulses to provide a measure of the magnitude of said parameter.

* * * * *

UNITED STATES PATENT AND TRADEMARK OFFICE
CERTIFICATE OF CORRECTION

PATENT NO. : 4,351,037

DATED : September 21, 1982

INVENTOR(S) : Serge A. Scherbatskoy

It is certified that error appears in the above-identified patent and that said Letters Patent are hereby corrected as shown below:

Change the title of the application to:
"A TELEMETERING SYSTEM FOR USE WHILE CONDUCTING DRILLING OPERATIONS EMPLOYING IMPROVED VALVE FUNCTIONS"

Delete the Abstract of the Disclosure and replace with the following Abstract:

Abstract of the Disclosure

A telemetering system for conducting drilling operations which employs a string of drill pipe extending from the earth's surface having a drilling bit at the lower end and a pump by which drilling fluid is forced downwardly through the drill string interior and bit to flow back to the surface through the well annulus, the system including a drilling fluid bypass above the bit providing fluid communication between the interior of the drill string and the well annulus, the bypass being opened and closed by an electrically operated valve having a valve stem, an instrument for detecting the magnitude of a downhole parameter and for producing an electrical signal in the form of electrical pulses in an arrangement which supplies a relatively large amount of electrical power to initiate opening the valve and substantially less power when the valve is open or closed to generate pressure pulses in the drilling fluid, and apparatus at the earth's surface to detect such pressure pulses to provide a measure of the magnitude of the parameter. The system may include a compensating piston subject to drilling fluid pressure connected to the valve stem to assist in opening and closing operations.

Column 11, line 47, after "and", insert --(b)--

Column 15, line 41, change "S(t=T)" to --S(t-T)--.

Claim 11, line 3, after "provided", insert --by--.

Column 17, line 43, change "(axes A and D)" to --(axes C and D)--

UNITED STATES PATENT AND TRADEMARK OFFICE
CERTIFICATE OF CORRECTION

PATENT NO. : 4,351,037

DATED : September 21, 1982

INVENTOR(S) : Serge A. Scherbatskoy

It is certified that error appears in the above-identified patent and that said Letters Patent are hereby corrected as shown below:

Summary of the Invention

This invention relates to a system for making measurements while drilling in a well bore. The invention is employed in a drilling system which includes a drill bit and a mud pump for circulating drilling fluid under pressure. The invention generally includes instruments for measuring one or more downhole parameters near the drill bit, a circuit for generating a sequence of electrical pulses representative of the measured parameter, and an electrically operated valve for generating information carrying mud pressure pulses in the drilling fluid within the drill string in response to the electrical pulses. At the earth's surface apparatus is provided to detect the mud pressure pulses and utilize the sequence of these pulses to produce signals representative of the measured parameter. The apparatus at the earth's surface includes an arrangement to substantially eliminate the effects of the pressure pulsations generated by the mud pump and to extract the information carrying mud pressure pulses.

The valve controlling fluid flow through the bypass includes an electrically controlled valve stem. A source of electrical power, such as a battery, is employed in the downhole system. The invention provides a means of supplying a

UNITED STATES PATENT AND TRADEMARK OFFICE
CERTIFICATE OF CORRECTION

PATENT NO. : 4,351,037

DATED : September 21, 1982

INVENTOR(S) : Serge A. Scherbatskoy

It is certified that error appears in the above-identified patent and that said Letters Patent are hereby corrected as shown below:

relatively large amount of electrical power to initiate opening or closing the valve and substantially less power when the valve is opened or closed. A compensating piston connected to the valve stem is subjected to the pressure of the drilling fluid to assist in the valve closing and opening operations.

Signed and Sealed this

Nineteenth Day of November 1985

[SEAL]

Attest:

Attesting Officer

DONALD J. QUIGG

Commissioner of Patents and Trademarks